United States Patent Office 3,264,094
Patented August 2, 1966

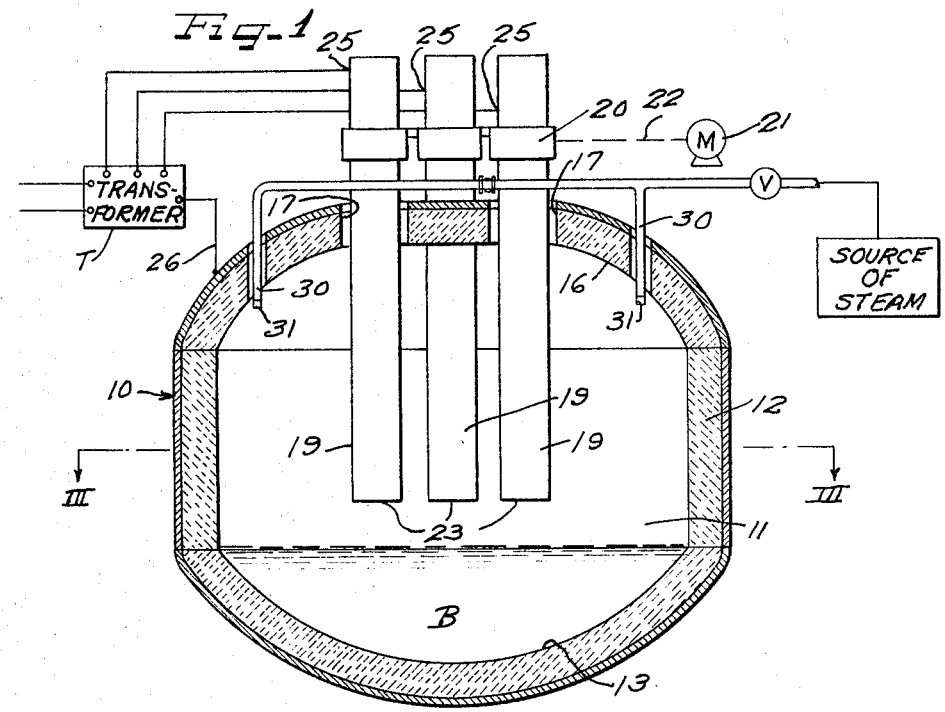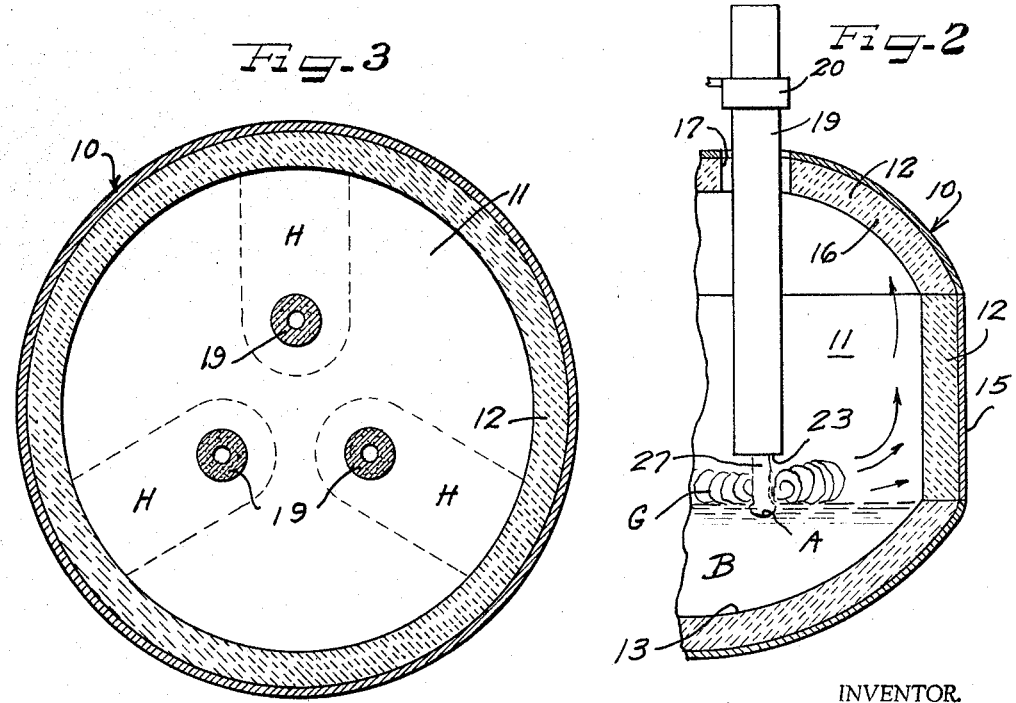

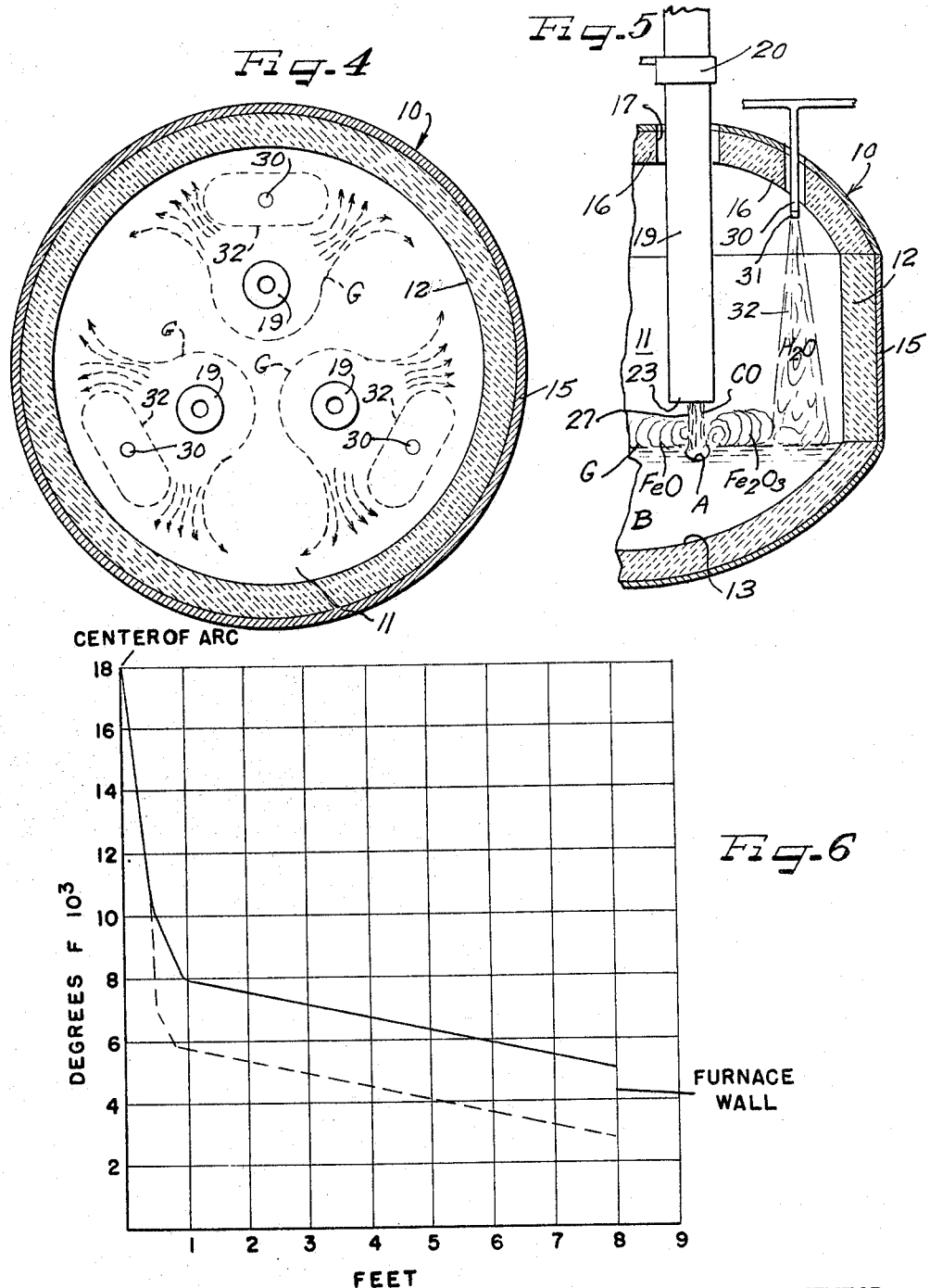

3,264,094
METHOD AND MEANS FOR MELTING METAL AND INCREASING THE LIFE OF THE REFRACTORY LINING OF A MELTING VESSEL
Charles G. Robinson, Sterling, Ill., assignor to Northwestern Steel & Wire Company, Sterling, Ill., a corporation of Illinois
Filed Mar. 23, 1964, Ser. No. 353,879
6 Claims. (Cl. 75—11)

This invention relates to an improved method and apparatus for melting metals and more particularly relates to a method and apparatus for improving the heat balance within a melting vessel and thereby increasing the efficiency of melting and the life of the refractory lining of the melting vessel.

This application is a continuation in part of an application Serial No. 191,177 filed by me on April 30, 1962, now abandoned, and entitled "Method of Melting Ore in an Electric Furnace." Application Serial No. 191,177 relates generally to a method and apparatus for increasing arc-power and efficiency of heat transfer in an electric melting vessel of the so-called arc-type, in which the arc-power and efficiency of the heat transfer of an electric furnace of the so-called arc-type is enhanced by ejecting water or steam into the furnace through the hollow interior of the electrodes or through the roof of the furnace.

In application Serial No. 191,177 it is shown that where a fluid, such as air, water or steam, or various other similar chemicals, is injected into an electric furnace through the hollow interior of the electrode, the fluid will be heated as it passes through the electrode to a temperature which may be of the order of 1200 degrees centigrade, and will be injected into the high density arc-zone of the electrode in this heated state. Due to the high current density of the arc-area the fluid will whirl in the region of the arc and the gas particles will mutually collide until the mean kinetic energy of the gas particles becomes comparable to the ionization particles of the gas, with the resultant cascading ionization of the gas and the creation of a high temperature plasma flame in the arc-zone. This will establish temperatures in the arc-zone in the range of 50 thousand degrees F., and a velocity of the gases of at least 1650 feet per second.

This heat is expanded radially and equally, and as the arc is converting the plasma and expanding the molecules at high velocities, and the atoms and molecules are accelerating through the intense magnetic field of the arc and the electrode column, electric energy will be generated and additional heat will be created in the arc-zone.

It has further been found in carrying out the method of the parent application that where the fluid injected through the hollow electrode is water, the fluid enters the arc-zone as water, expands as steam in the arc-zone and is then dissociated, and as the atoms are expanded through the high density arc-zone they generate additional heat in the arc-zone and come out in the form of electric energy.

The heat liberated by the introduction of the water into the arc-zone and added to the heat of the furnace will thus be:

(1) The heat of the steam as the water is converted into steam;

(2) The heat of dissociation of the water into hydrogen and oxygen;

(3) The heat generated as the atoms are shot through the high density arc-zone and come out in the form of electric energy;

(4) The heat of recombining the hydrogen and oxygen in the form of steam;

(5) The heat liberated by the hydrogen; and (6) The exothermic heat generated as the level of the oxygen is raised.

It is further known that in an electric arc melting vessel, when the arc-stream strikes the bath of metal in the furnace, the high concentration of power from the arc causes the small area where the arc stream strikes, to vaporize instantaneously and expel highly ionized gas of extremely high temperatures, which begins to flow outwardly and have a tangential effect. This flow of the hot gases is expelled from the electrode toward the sidewall of the furnace and then upwardly along the roof area, escaping around the electrode port.

This tangential effect of the gas at each electrode, extending outwardly of the electrode to the furnace wall produces what is commonly called a "hot spot" in the furnace caused by the flow of the hot gases expelled outwardly toward the side wall of the furnace. These "hot spots" erode the refractory lining of the furnace faster than in the areas between the hot spots.

It has been found that by propagating a steam blanket or envelope in the hot spot area of the furnace that the normal gas flow patterns will be broken up by the force of the steam envelope and that the high temperature gas flow is diverted from the hot spot area with the result that some of the heat is going into the cold spot area of the furnace.

The dense water vapor of the steam blanket or envelope thus absorbs some of the heat energy of the hot gases and diffuses the heat energy and causes a temperature drop to the side wall of the furnace. The steam envelope or blanket also holds the propagated heat downwardly in the vessel against the molten bath area and increases the efficiency of the radiant heat transfer from the gases involved, and turns this energy into the total molten metal, thereby speeding up the incremental bath temperature rise.

This steam blanket also effects the condensation of the metallic vapors in the form of iron oxide and manganese oxide on the inner surface of the roof area, forming a crust on the roof of the melting vessel, resulting in a better temperature distribution at the top of the vessel, and thereby protecting the roof and refractory side walls of the vessel and resulting in a more even melting of the refractory side walls around the periphery of the furnace thereby doubling the life of the roof and lining of the furnace.

In addition, the steam jet envelope or blanket coming down from the roof area reacts with the carbon of the electrodes and forms CO gas and free hydrogen which reacts with the iron oxides and reduces some of the iron oxide smoke or fume back to metallic iron, with the resultant higher yields and better melting efficiencies of the furnace.

A principal object of the present invention is to improve upon the melting of metals in a refractory heating vessel and to lengthen the life of the refractory lining of the vessel by introducing steam directly into the vessel to break up the normal gas flow pattern within the vessel.

Another object of the invention is to protect the refractory side walls and roof of a direct arc-heating vessel from excessive and uneven refractory wear by the propagating of a steam blanket into the vessel.

A still further object of the invention is to introduce steam in the hot spot areas of a three-phase electric furnace and disperse the high temperature highly ionized gas at the tips of the electrodes.

It is a further object of the present invention to provide an improved method of melting metals in a three-phase electric arc-furnace by holding the heat of the expanding gases downwardly in the furnace against the molten bath area, to effect the depositing of the energy of the gases into the total molten metal area of the furnace, and the resultant speeding up of the incremental bath temperature rise.

Still another object of the invention is to provide through the introduction of steam into the hot spots of an electric furnace, the propagation of a steam blanket, dispersing the flow of the high temperature gases toward the cold spots of the furnace, and so reducing the roof temperature of the furnace to effect the recondensing of the metallic vapors on the roof, to form a protective crust on the inner surface of the roof.

A still further object of the invention is to provide a better temperature distribution at the top of a melting vessel by introducing high velocity steam into the hot areas of the vessel with a resultant reduction in temperatures of the roof and side walls of the vessel and a more even wear of the refractory lining of the vessel.

Another object of the invention is to recondense the metallic vapors on the refractory lining of a melting vessel and recapture the meltable materials normally lost in the fumes expelled from the vessel, by controlling the high temperature flows of the gases by the introduction of steam into the hot spot areas of the furnace and the propagation of steam blankets of different geometries into the furnace vessel.

Yet another object of the invention is to provide an improved form of electric heating vessel so constructed and arranged as to result in the proper distribution of heat in the vessel with a resultant longer life of the refractory lining of the vessel and the recondensing of the metallic vapors on the inner lining of the vessel, and the recapturing of the metallic material normally lost in fumes.

A further object is to provide an improved form of melting vessel having means associated therewith for introducing steam into the vessel to combine with the graphite or carbon electrodes at elevated temperatures and produce reductant gases enticing the recovery of various metals in the oxide phases.

These and other objects of the invention will appear from time to time as the following specification proceeds and with reference to the accompanying drawings wherein:

FIGURE 1 is a diagrammatic partial vertical sectional view taken through an illustrative form of three phase electric furnace, illustrating one form in which the invention may be embodied;

FIGURE 2 is an enlarged fragmentary diagrammatic vertical sectional view taken through a conventional furnace and showing one electrode of the furnace, to illustrate the arc pattern of the electrode and the gas flow to the side wall of the furnace and out through the port opening for the electrode;

FIGURE 3 is a horizontal sectional view taken through a conventional form of electric furnace and showing the hot and cold regions of the furnace;

FIGURE 4 is a diagrammatic fragmentary vertical sectional view somewhat similar to FIGURE 2, but illustrating the injection of steam into the furnace;

FIGURE 5 is a diagrammatic horizontal sectional view of the furnace shown in FIGURE 1 and showing the general form of the steam envelope or blanket attained by the injection of steam into the hot spots of the furnace and the dispersion of the gases by the steam blanket into the cold areas of the furnace; and FIGURE 6 is a temperature distance graph illustrating the temperatures from the center of the electrode to the furnace wall, with and without the injection of steam in the hot spots of the furnace.

The principles of the present invention are applicable to any heating vessel for melting ferrous and non-ferrous metals and are applicable to reheat furnaces, open hearth furnaces, blast furnaces, oxygen converters, rotary kilns, soaking pits etc. In the interest of simplicity, however, the present invention will be described in connection with a conventional three-phase arc melting furnace or vessel.

The general design of the three phase arc-type furnace shown in the drawings is that of any furnace construction conventionally provided, and for that reason the furnace is herein shown in diagrammatic form only. The furnace is generally indicated by reference numeral 10 and it will be understood that the furnace is conventionally in the form of a refractory lined vessel comprising a heating chamber 11 provided, for example, by a steel bowl with a refractory lining such as is shown at 12. The furnace 10 has a hearth 13 which is a shallow bowl formed in the refractory of the bottom lining and is further shown as having a generally cylindrical side wall 15 extending upwardly from the hearth 13 and terminating into a roof 16, apertured as at 17, 17 to form one or more port openings through which vertical carbon or graphite electrodes 19 extend.

The electrodes 19 are shown in FIGURES 1 and 2 as being carried in a holder 20, which may be mounted on the outside of the furnace for adjustable movement, to space the ends of the electrodes in the proper spaced relation with respect to the melt in the furnace. The holder 20 may be vertically moved by a winch and rope system, motor driven, or may be actuated by any other form of automatic electrode advancing mechanism, such as is shown schematically by the motor indicated at 21, and having mechanical connection 22 with the electrode holder 20.

It will be understood that the electric melting furnace 10 is shown only diagrammatically and that any conventional form of charging means can be provided, for example, a door charge type or a top charge type of access mechanism may be provided to accommodate a charge of metal to be melted to be injected into the heating chamber.

The electrodes 19 each have a tip 23 which extends into the heating chamber 11 into proximity with a charge of metal in the hearth 13, for reducing the charge of metal into a bath B.

In order to draw and maintain an arc between the tips 23 of the electrodes 19 and the charge, or the bath B, after the molten stage is reached, a conventional electrical circuit means is provided. Thus, as shown in FIGURE 1, a transformer indicated generally at T has a primary circuit connected to the usual source of electrical energy. The secondary circuit of the transformer T is connected to the electrodes 19 as at 25 and to the furnace 10 as at 26. In order to give stability to the circuit and to limit the current when the electrode 19 makes contact with the charge, a reactance (not shown) is included in the primary circuit of the transformer T.

The electrodes 19 may be generally cylindrical columns of graphite or carbon, and may be hollow or solid, such electrodes, however, usually being hollow. In FIGURE 2 of the drawings, I have shown one electrode of a conventional form of three-phase electric arc furnace and have diagrammatically shown a main arc stream 27 depositing on a definite area A on the meltable material. When the material in the furnace is in a liquid state, the metal bath B is present of a depth substantially up to the lower margin of the side wall 12.

The high concentration of power from the arc, as the arc stream strikes the bath, principally during the refining period, causes the small area A to vaporize instantly into projected lines G. The expulsion of this highly ionized gas of extremely high temperatures begins to flow outwardly and has a tangential effect in a three-phase arc furnace. The flow lines indicated by the arrows, indicate that the flow of the hot gases is expelled outwardly toward the side wall of the furnace and then upwardly along the roof area and escaping through the electrode ports 17. The lines of escape of the hot gases form what are commonly called "hot spots" tangential to each of the electrodes, and designated by H in FIGURE 3. The flowing gases in the hot spots erode the refractory faster than in the other areas about the circumference of the furnace wall.

It may be seen from the graph of FIGURE 6 that the temperature at the central portion of the arc stream 27 is 18,000° F. and that as the distance from the central portion of the arc stream increases toward the side wall, the temperature will be at 5,000° F. at the side wall of the furnace.

In FIGURE 3 the areas H designate the approximate geometry of the hot spot areas and also designate the general path of the gas as it is propelled outwardly toward the furnace wall and then upwardly into the roof. The areas H at the wall of the furnace always fail first in the lining because of the elevated gas temperatures into these areas and the spaces between the areas H, commonly called the cold spot areas, have a longer liner life but a lower melting temperature.

Referring now in particular to FIGURES 4 and 5 and certain novel features of the invention, a separate steam supply pipe 30 for each electrode 19 leads downwardly through the roof 16 into the hot spot area of the furnace, and is shown as being in radial alignment with an associated electrode 19. The pipes 30 are connected at their outer ends to a suitable source of supply of steam, and each has a downwardly directed nozzle 31 on its inner end, directing steam downwardly into the hot spot area of the furnace and forming a steam envelope or blanket 32, serving to disperse the high temperature propelling gas G. As shown in FIGURES 4 and 5, the water vapor in the steam envelope 32, introduced into the high temperature propelling gas at a high velocity and at a much lower temperature than the temperature of the gas, tends to break up the normal gas flow patterns and diffuses the gas flow patterns along lines indicated generally by reference character F, and diverts the main high-temperature gas flow from the hot spot areas from the normal tangential flow into the cold spot areas of the furnace (FIGURE 5).

Referring now to the dashed line of FIGURE 6, it may be seen that where steam is injected in the hot spot area of the furnace, the central arc column temperature is still at 18,000° F., the temperature gradient drop indicated by the dashed line, however, shows a marked decrease in temperature as soon as the gases leave the electrode, and the temperature at the side wall of the furnace, where the steam envelopes are propagated in the hot spots of the furnace, reduces the temperature at the side wall of the furnace to 3000 degrees, resulting in a much longer refractory life, both of the side walls and roof area of the furnace.

It has further been found that where steam envelopes are maintained in the hot spots of the furnace, that the metallic vapors, principally iron oxide and manganese oxide condense on the inner surface of the roof and form a crust on the roof, which has been found to be approximately .041 inch thick. This is proof of the lower thermodynamic values attained by the propagation of steam envelopes in the furnace and of the changing of the gas patterns inside of the furnace by the high velocity water vapor entering the furnace at much lower temperatures than the gas. The temperature along the inner surface of the roof must thus be considerably lower than the melting point of iron and of manganese, which metals melt at 2802° F. and 2207° F., respectively.

The lowering of the sidewall temperatures along the hot spot regions of the furnace together with the lowering of the temperature of the roof of the extent that the metal oxides will condense on the roof, conclusively demonstrates that the steam envelopes result in a better temperature distribution at the top of the melting vessel, resulting in the protection of the refractory side walls and roof of the furnace.

Where steam has been injected into the hot spots of a three-phase electric arc furnace, the life of the refractory lining of the side wall and roof has been more than doubled and the refractory side walls melt evenly around the periphery of the furnace.

In FIGURE 4 I have generally designated the gases in a propelling gas pattern around the electrode as being composed of FeO and $Fe_2O_3$. Since the electrodes of direct arc furnaces are either carbon or graphite electrodes, the steam envelope over the molten bath in the area of the propelling gases tends to react with the carbon of the electrodes and form CO gas and free hydrogen. The free hydrogen thus reacts with the iron oxide and reduces some of the iron oxide smoke or fume back to metallic iron in a manner well known to those skilled in the art, so not herein shown or described further.

The reduction of the oxides by the steam thus results in higher yields and better melting efficiencies in the direct arc furnace since the metallics in the oxide phase are reduced back to metals and by reducing the dense red smoke, characteristic of the iron oxide, the process is particularly beneficial where the melting unit may be in an urban area.

It should here be understood that while I have referred to the introduction of steam into the melting vessel, that water may be introduced into the vessel through a nozzle under pressure and be heated by the arc and charge into steam as in my parent application Serial No. 191,177 of which this application is a continuation-in-part.

Although various modifications in the invention might be suggested by those versed in the art, it should be understood that I wish to embody within the scope of the patent warranted hereon all such modifications as reasonably and properly come within the scope of my contribution to the art, as defined by the claims appended hereto.

I claim as my invention:

1. In a method of melting ferrous metals in a direct arc three phase electric melting vessel having a refractory lined wall and having three equally spaced delta arranged electrodes spaced equal distances inwardly from the refractory lined wall of the vessel and creating hot spot regions along the refractory lined wall of the vessel in general radial alignment with electrodes, in which a ferrous charge is melted to produce a molten bath by the propagated heat attained by the high density arcs between the electrodes and the charge in the vessel, the improvements comprising the steps of:

protecting the refractory lined wall of the vessel by creating and maintaining steam blankets within the vessel in each hot spot region in the vessel and holding the heat downwardly by the steam blankets and breaking up the normal gas flow patterns by the steam force and absorbing and diffusing some of the heat energy by the steam blankets to effect a temperature drop along the side wall of the vessel.

2. The method of claim 1 wherein the steam blankets are created and maintained by introducing water downwardly into the vessel between the electrodes and the lined wall of the vessel and heating the water to steam by the heat created by the direct arcs between the electrodes and the charge, reducing the charge to its molten stage.

3. The method of claim 2 in which the steam blankets are created and maintained by the introduction of steam downwardly into the vessel between the electrodes and wall of the vessel, in the hot spot region of the vessel.

4. In an electric melting furnace, a melting vessel having a roof and a generally cylindrical wall depending therefrom, at least three electrodes leading through the roof of the vessel to a position adjacent the melting zone in the vessel and equally spaced about the melting zone and being in the form of graphite columns, energizing circuits for said electrodes forming and maintaining confined arc zones between the tips of said electrodes and a charge within the vessel, and means protecting the lining of the vessel and increasing the efficiency of the radiant heat transfer from the gases involved comprising a steam jet in association with each electrode, extending downwardly through the roof of the vessel and introducing high velocity steam into the vessel and thereby propagating steam blankets into the vessel, directing the flow of high velocity gases into the areas of the vessel along the cylindrical wall of the vessel between the electrodes and holding the propagated heat downwardly in the vessel against the molten bath area.

5. In an electric melting furnace, a melting vessel having a roof and a generally cylindrical wall extending downwardly therefrom, at least three electrodes leading through the roof of the vessel to a position adjacent a melting zone in the vessel and equally spaced about the melting zone and being in the form of graphite columns, energizing circuits to said electrodes to form and maintain confined arc zones between the tips of said electrodes and a charge within the vessel, and means for increasing the life of the refractory lining of the vessel, comprising a steam jet in association with each electrode and leading downwardly through the roof of the vessel into the hot spots inwardly of the cylindrical wall of the furnace and injecting high velocity steam into the vessel in the region of the hot spots during the melting of the charge in the furnace.

6. In a three phase direct arc electric melting furnace, a melting vessel having a hearth,
a cylindrical wall extending upwardly from said hearth and a roof extending over said cylindrical wall,
said hearth, cylindrical wall and roof having inner refractory linings,
at least three electrodes leading through the roof of the vessel to a position adjacent the hearth,
said electrodes being spaced substantial distances inwardly of the wall of the furnace, equal distances from the wall and equal distances apart,
energizing circuits to said electrodes to form and maintain confined arc zones between the tips of said electrodes and the charge in said hearth,
and means for increasing the life of the refractory lining of the vessel, comprising
an individual steam jet in association with each electrode,
each steam jet entering the vessel and having a downwardly facing discharge end disposed between the electrode and the wall of the vessel and injecting high velocity steam into the vessel during the melting of ore therein, downwardly into the space between the electrode and wall of the vessel into the hot spot region of the vessel and propagating steam blankets into the vessel,
directing the high velocity gases outwardly from the hot spot region along the wall of the vessel between the electrodes,
and holding the propagated heat downwardly in the vessel against the molten bath area in the hearth.

References Cited by the Examiner
UNITED STATES PATENTS 3,136,835  6/1964  Dillon et al. _____ 13—34

HYLAND BIZOT, *Primary Examiner.*

DAVID L. RECK, *Examiner.*

H. F. SAITO, *Assistant Examiner.*